(12) United States Patent
Sharma et al.

(10) Patent No.: US 11,928,480 B2
(45) Date of Patent: Mar. 12, 2024

(54) SYSTEM AND METHOD FOR CONFIGURABLE DEVICE DEPLOYMENT

(71) Applicant: Dell Products L.P., Round Rock, TX (US)

(72) Inventors: Rohit Sharma, West Pennant Hills (AU); David Alan Hooper, Crows Nest (AU)

(73) Assignee: Dell Products L.P., Round Rock, TX (US)

( * ) Notice: Subject to any disclaimer, the term of this patent is extended or adjusted under 35 U.S.C. 154(b) by 99 days.

(21) Appl. No.: 17/513,097

(22) Filed: Oct. 28, 2021

(65) Prior Publication Data
US 2023/0136031 A1    May 4, 2023

(51) Int. Cl.
*G06F 9/44* (2018.01)
*G06F 1/20* (2006.01)
*G06F 1/28* (2006.01)
*G06F 9/445* (2018.01)

(52) U.S. Cl.
CPC .......... *G06F 9/44505* (2013.01); *G06F 1/206* (2013.01); *G06F 1/28* (2013.01)

(58) Field of Classification Search
CPC ......... G06F 9/44505; G06F 1/206; G06F 1/28
See application file for complete search history.

(56) References Cited

U.S. PATENT DOCUMENTS

| | | | | |
|---|---|---|---|---|
| 6,256,732 B1* | 7/2001 | Cromer | ................... | G06F 1/181 |
| | | | | 53/428 |
| 7,310,737 B2* | 12/2007 | Patel | .................. | H05K 7/20736 |
| | | | | 713/300 |
| 7,372,695 B2* | 5/2008 | Coglitore | .................. | G06F 1/20 |
| | | | | 361/679.48 |
| 7,597,567 B2* | 10/2009 | Tanaka | ................. | H01R 12/725 |
| | | | | 439/135 |
| 7,990,700 B2* | 8/2011 | Guo | ........................ | G06F 1/184 |
| | | | | 361/694 |
| 8,031,468 B2* | 10/2011 | Bean, Jr. | ............. | F28D 15/0266 |
| | | | | 361/679.48 |
| 8,944,470 B2* | 2/2015 | Mayrhofer | ............ | G09F 3/0341 |
| | | | | 283/81 |
| 9,226,427 B2* | 12/2015 | Liu | ..................... | H05K 7/20145 |
| 10,356,953 B2* | 7/2019 | Koo | ................... | H05K 7/20736 |
| 10,488,899 B2* | 11/2019 | Shah | ......................... | G06F 1/26 |

(Continued)

*Primary Examiner* — Zahid Choudhury
(74) *Attorney, Agent, or Firm* — Womble Bond Dickinson (US) LLP

(57) ABSTRACT

Methods and systems for managing configurable devices are disclosed. A configurable device may be a type of hardware device that may be configured for various purposes. The operation of the configurable device may depend on its configuration. To manage the configurable devices, a system may configure the configurable devices to provide desired functionalities. Once configured, the configured configurable devices may be deployed to a deployment site where they may provide their respective functionalities. As part of the process of configuring and deploying the configurable devices, the configurable devices may be moved between various locations. To protect and otherwise physically manage the configurable devices, the configurable device may be packaged with compliant packaging. The compliant package may facilitate configuration of the configurable devices.

20 Claims, 8 Drawing Sheets

(56) References Cited

U.S. PATENT DOCUMENTS

2011/0102148 A1\* 5/2011 Laffey ................... H04L 41/082
  340/10.1
2022/0386513 A1\* 12/2022 Heydari ............. H05K 7/20836

\* cited by examiner

Compliant Packaging 210

Access Element 212

SYSTEM AND METHOD FOR CONFIGURABLE DEVICE DEPLOYMENT

FIELD

Embodiments disclosed herein relate generally to device management. More particularly, embodiments disclosed herein relate to systems and methods to manage configuration of multiple configurable devices.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
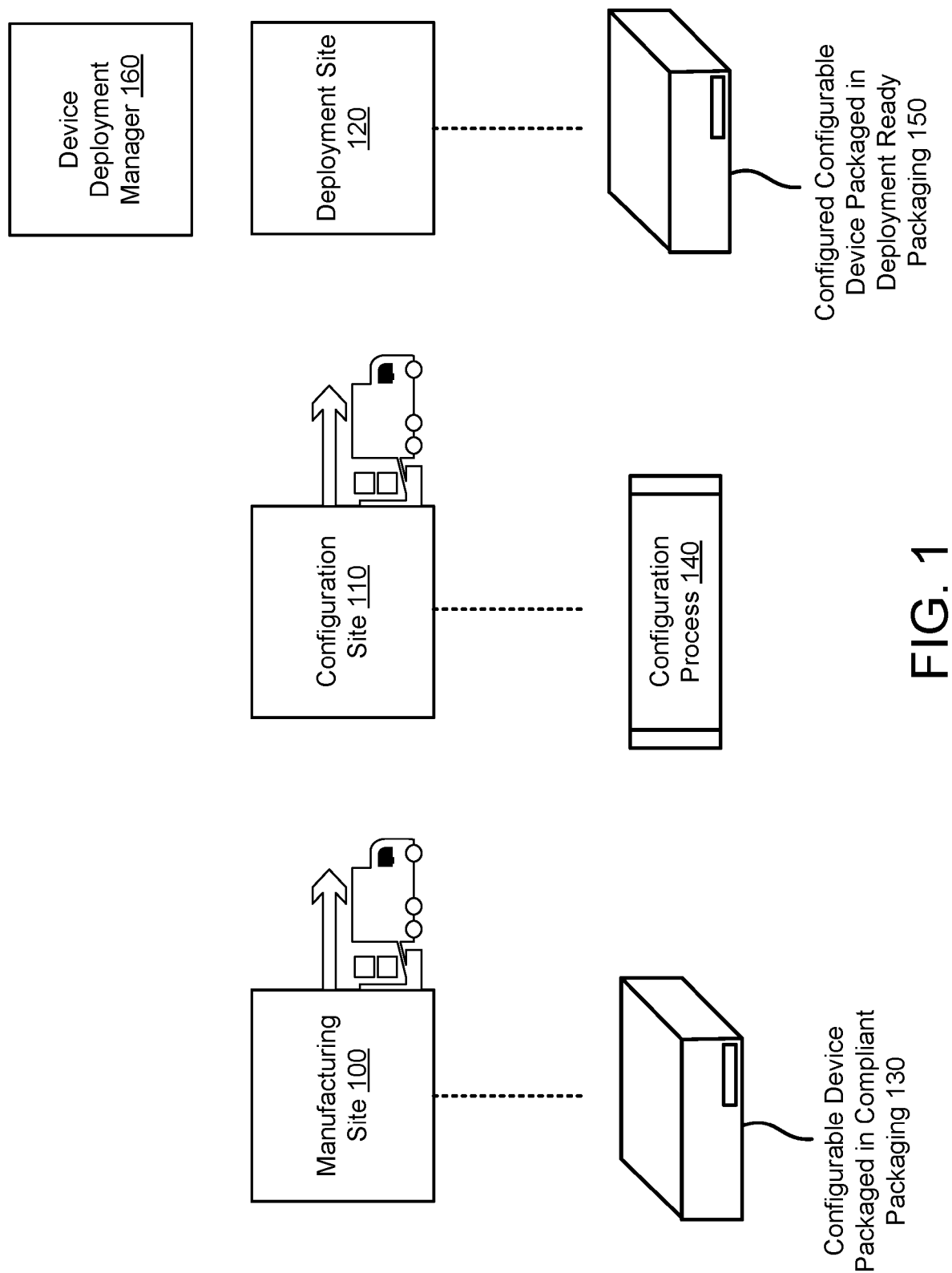
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing configurable devices. A configurable device may be a type of hardware device that may be configured for various purposes. The operation of the configurable device may depend on its configuration. To manage the configurable devices, a system in accordance with an embodiment may configure the configurable devices to provide desired functionalities. Once configured, the configured configurable devices may be deployed to a deployment site where they may provide their respective functionalities.

As part of the process of configuring and deploying the configurable devices, the configurable devices may be moved between various locations. To protect and otherwise physically manage the configurable devices, the configurable device may be packaged with compliant packaging.

Compliant packaging may be implemented with a physical device (e.g., a box and/or other structures) that includes one or more feature that allow for the configuration of a configurable device without removing the compliant packaging and/or otherwise causing the configurable device to be repackaged as part of (e.g., prior to, during, and/or after) configuration. To provide for configuration of the configurable device packaged with it, the compliant packaging may include an access element. The access element may provide for temporary physical access to a portion of the configurable device within the compliant packaging for configuration purposes. For example, information, power, etc. may be provided to the configurable device to configure it using the physical access provided by the access element.

Once configured, the access element may be adapted to secure the compliant packaging such that further configuration, modification, or interaction with a configuration device in the compliant packaging may be detectable. Thus, once the access element is used to seal the compliant packaging, the compliant packaging may be deployment ready packaging usable to deploy the configured configurable device to a location. By doing so, it may be more likely that configured configurable devices are deployed with desired configurations. For example, the access element or other feature may indicate whether a configured configurable device has been accessed via the access element after the configurable device is configured.

Additionally, by allowing for configuration of configurable devices without needing to remove existing packaging or repackage configured configurable devices, a system for deploying configurable devices in accordance with an embodiment disclosed herein may (i) reduce the consumption of packaging materials for configurable device deployment, (ii) may reduce the energy and/or time for configuring configurable devices, (iii) may improve the security of configurable devices by providing for the detection of physical interference with such devices, (iv) may improve device hygiene by improving the time during which configurable devices are maintained in packaging, and/or (v) reduces the likelihood of configurable devices being damaged during configuration by maintaining protective packaging coverage during configuration.

In an embodiment, a method for managing a configurable device is provided. The method may include obtaining the configurable device packaged in compliant packaging; operably connecting the configurable device packaged in the compliant packaging to a configuration station using an access element of the compliant packaging and a communication element; while the configuration station is operably connected to the configurable device and with the configuration station: changing a power state of the configurable device from unpowered to powered, while in the powered state, configuring the configurable device with the communication element to obtain a configured configurable device, and changing a power state of the configured configurable device from powered to unpowered; disconnecting the configured configurable device from the configuration station; and sealing the compliant packaging to obtain a configured configurable device packaged in deployment ready packaging.

Operably connecting the configurable device packaged in the compliant packaging to the configuration station may include actuating the access element to unseal the compliant packaging; inserting the communication element into the unsealed compliant packaging; and physically connecting a connector of the communication element to a corresponding connector of the configurable device.

Actuating the access element to unseal the compliant packaging may create a sealable opening on an exterior of the compliant packaging through which the connector of the communication element is inserted. Sealing the compliant packaging may include sealing the sealable opening.

Changing a power state of the configurable device from unpowered to powered may include sending, with configuration station, power to the configurable device via the communication element.

Configuring the configurable device with the communication element may include modifying a configuration of a basic input output system hosted by the configurable device; modifying at least one piece of firmware hosted by the configurable device; and instantiating a software image in storage of the configurable device.

Changing a power state of the configured configurable device from powered to unpowered may include terminating, with configuration station, delivery of power to the configured configurable device via the communication element.

The method of managing the configurable device may also include packaging the configurable device in the compliant packaging at a first location; and transporting the configurable device packaged in the compliant packaging to a second location where the configuration station is positioned. The method may further include transporting the configured configurable device packaged in the deployment ready packaging from the second location to a third location; and deploying the configured configurable device by, at least in part, discarding the deployment ready packaging. The method may additionally include, while the power state of the configured device is powered: injecting a fluid flow (e.g., air flow) through the compliant packaging to manage a thermal state of the configurable device.

In addition, the method may also include after the power state of the configured device is changed to unpowered and prior to sealing the compliant packaging: positioning a connector blocker with the configured configurable device to prevent formation of operable connections to the configured configurable device until the deployment ready packaging is removed.

Sealing the compliant packaging comprises applying a security sticker across an opening in an exterior of the compliant packaging.

The configurable device may not be removed from the compliant packaging until the configured configurable device is deployed.

The communication element may include a single cable through which power and data are transmitted to the configurable device while the configurable device is operably connected to the configuration station.

Configuring the configurable device may further include modifying operation of the configurable device to prioritize thermal management until the power state of the configured configurable device is changed to unpowered and to prioritize performance thereafter.

In an embodiment, a packaged device is provided. The packaged device may include a configurable device including a computing device and a connector adapted to operably connect the computing device to a configuration system. The packaged device may also include compliant packaging that may include an enclosure positioned around the configurable device; and an access element positioned to facilitate operable connection of the connector to a configuration station positioned outside of the compliant packaging. The access element may be adapted to transition between a first position and a second position, while in the first position the access element may seal the configurable device from an ambient environment, while in the second position the access element may open a portion of the configurable device corresponding to the connector to the ambient environment.

The packaged may also include a security element positioned with the access element, the security element being adapted to indicate whether physical access to the configurable device has been made after the configurable device has been configured.

The packaged device may further include a connector blocker adapted to block physical access to the connector after the connector blocker is positioned with the connector.

In an embodiment, a system is provided. The system may include a computing device; and a configuration station adapted to: operably connect a configurable device packaged in compliant packaging to the computing device using an access element of the compliant packaging and a single electronics cable by inserting a portion of the single electronics cable through an exterior of the compliant packaging; while the computing device is operably connected to the configurable device and with the computing device: change a power state of the configurable device from unpowered to powered, while in the powered state, configure the configurable device with the communication element to obtain a configured configurable device, and change a power state of the configured configurable device from powered to unpowered; and disconnect the configured configurable device from the configuration station.

The system may also include a physical management device adapted to manage a thermal state of the configurable device while the configurable device is in the powered state.

A non-transitory media may include instructions that when executed by a processor cause the method to be performed.

A computing device may include the non-transitory media and a processor, and may perform the method when the computer instructions are executed by the process.

Turning to FIG. 1, a diagram illustrating a system in accordance with an embodiment is shown. The system shown in FIG. 1 may provide for the management of configurable devices. A configurable device may be a device that is configurable to provide different functionalities depending on its configuration. Configuring a configurable device may change the manner in which the configurable device operates after configuration.

For example, consider an example configurable device such as a laptop computer. The laptop computer may host firmware, a basic input output system, an operating system, any number of applications, and/or may include configuration settings for these example pieces of software and other configurable options for software and/or hardware components. The functionality of the laptop computer may be greatly impacted by, for example, loading different versions of firmware, different operating systems, different applications, and/or changing various configuration settings. However, all of these different configurations and corresponding different functionalities may be provided with the same hardware device.

Figure 2A:
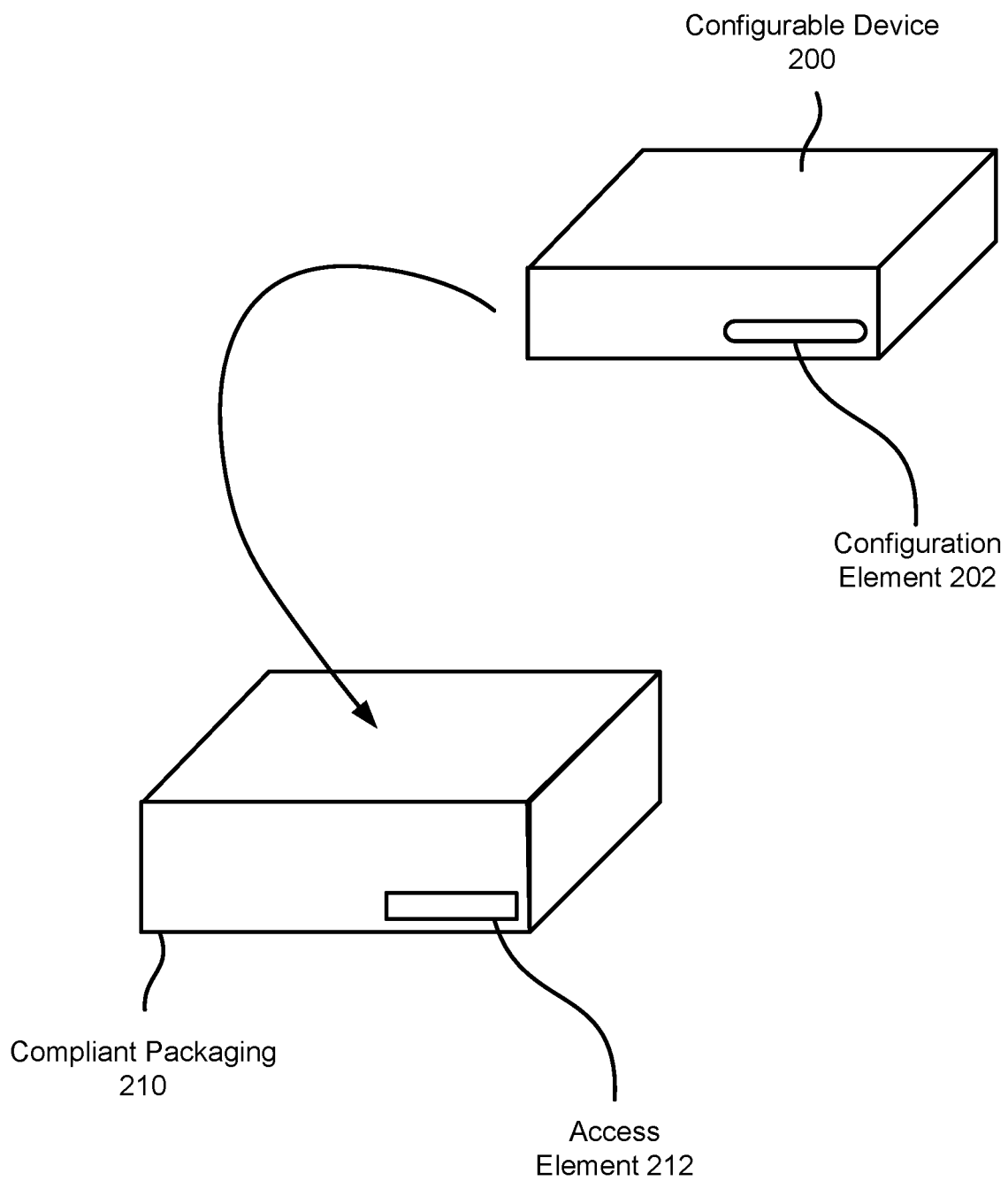
FIG. 2A shows a diagram illustrating compliant packaging and a configurable device in accordance with an embodiment.

To provide devices with desired functionalities, the system of FIG. 1 may include manufacture site 100. Manufacturing site 100 may be a location where a factory or other infrastructure component is located and/or provides for the manufacture and/or packaging of configurable devices in compliant packaging. When manufactured, the configurable devices may be configurable to provide various types of functionalities. As will be discussed below, the compliant packaging may be usable to facilitate configuration of the configurable devices at a later point in time but prior to deployment. Refer to FIG. 2A for additional details regarding packaging configurable devices with compliant packaging.

To provide for the configuration of configurable devices, the system of FIG. 1 may include configuration site 110. Configuration site 110 may be a location where a factor, service center, fulfillment center, and/or other infrastructure component is located and/or provides for the configuration of configurable devices in compliant packaging. When configured (e.g., prior to, during, and/or after configuration), the configurable devices may not be removed from the compliant packaging. Rather, the compliant packaging may include physical features that allow for (i) temporary exposure of various portions of the configurable device in the compliant packaging sufficient to provide for the configuration of a packaged configurable device and (ii) sealing of the compliant packaging after configuration of the configurable devices positioned therein. In this manner, configurable devices may be configured at configuration site 110 without removing them from the compliant packaging and, after configuration, the configured configurable devices may be deployed to a deployment site 120 using the compliant packaging (which may be referred to as deployment ready packaging). In other words, the configured configurable devices may not need to be repackaged even though the configurable devices are being configured at configuration site 110. By doing so, the quantity of materials used in the transportation and deployment of configurable devices may be reduced when compared to scenarios in which the configurable devices are repackaged when configured.

For example, consider a scenario where configurable device in compliant packaging 130 is completed at manufacturing site 100. After completion, configurable device in compliant packaging 130 may be shipped to configuration site 110 (which may be nearby such as a different portion of a facility or may be remote requiring trucking, boat, air, and/or other types of transportation to be used in the shipping). While at configuration site 110, configurable device in compliant packaging 130 may be subjected to configuration process 140 which may include, for example, loading various pieces of software (e.g., operating systems, firmware, a basic input output system, etc.) onto the configurable device, changing various configuration settings, etc. Configuration process 140 may include additional, fewer, and/or different operations without departing from embodiments disclosed herein.

However, rather than removing the configurable device from the compliant packaging prior to (or otherwise as part of) configuration, the configurable device may be configured while in the configurable packaging during configuration process 140. Once configured, the configurable packaging may be sealed to obtain deployment ready packaging. Consequently, when the configured configurable device is shipped to deployment site 120, configured configurable device packaged in deployment ready packaging 150 may be received at the deployment site 120 without needing for repackaging of the configured configurable device in deployment ready packaging. By not needing to remove the configurable device from the compliant packaging, materials and effort for packaging of the configurable device as it is moved from manufacturing site 100 to deployment site 120 may be reduced.

Figure 2B:
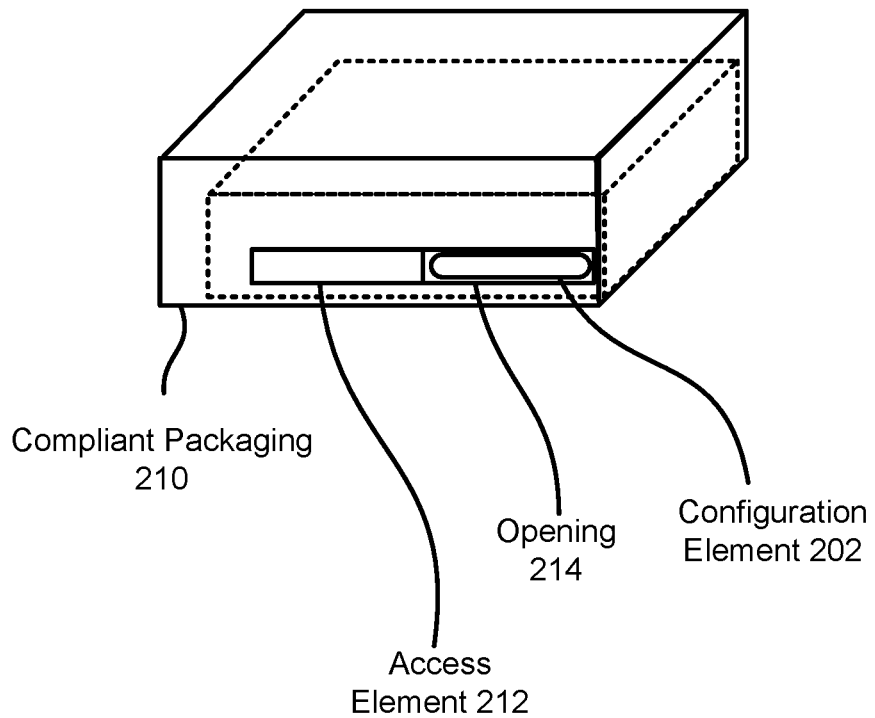
FIG. 2B shows a block diagram illustrating a configurable device positioned in configurable packaging in accordance with an embodiment.
Figure 2C:
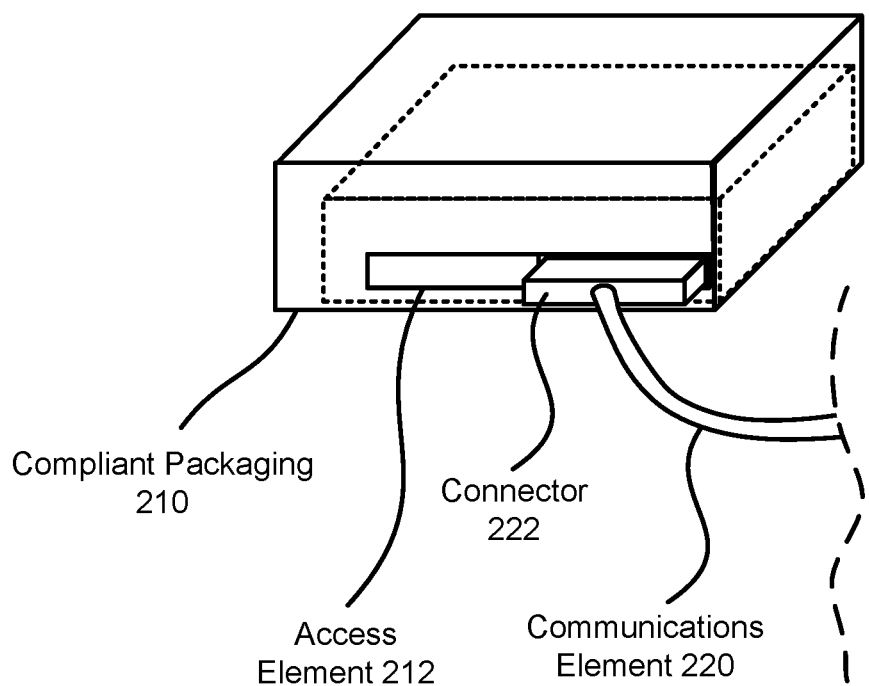
FIG. 2C shows a block diagram illustrating a configurable device positioned in configurable packaging while being configured in accordance with an embodiment.
Figure 2D:
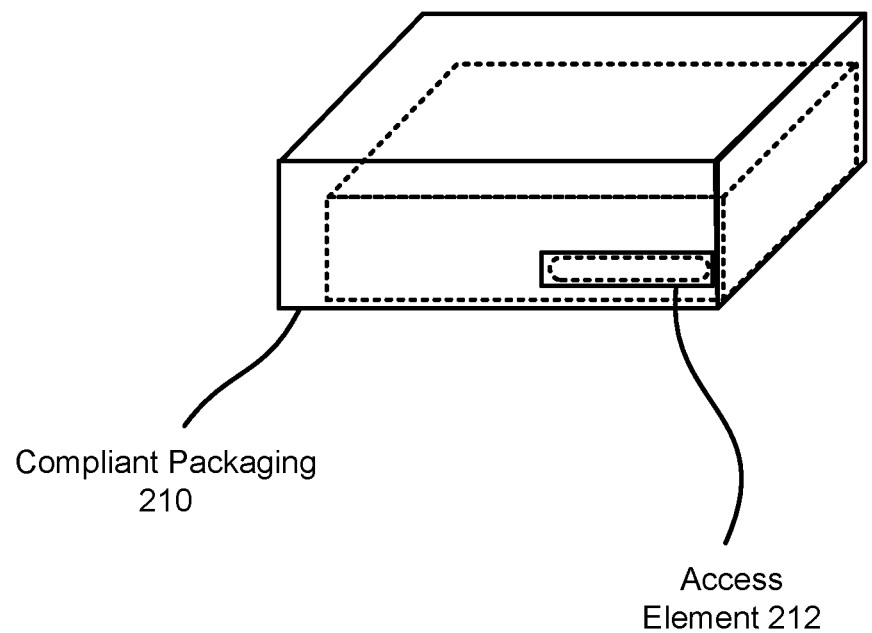
FIG. 2D shows a block diagram illustrating a configurable device positioned in configurable packaging after configuration in accordance with an embodiment.
Figure 2E:
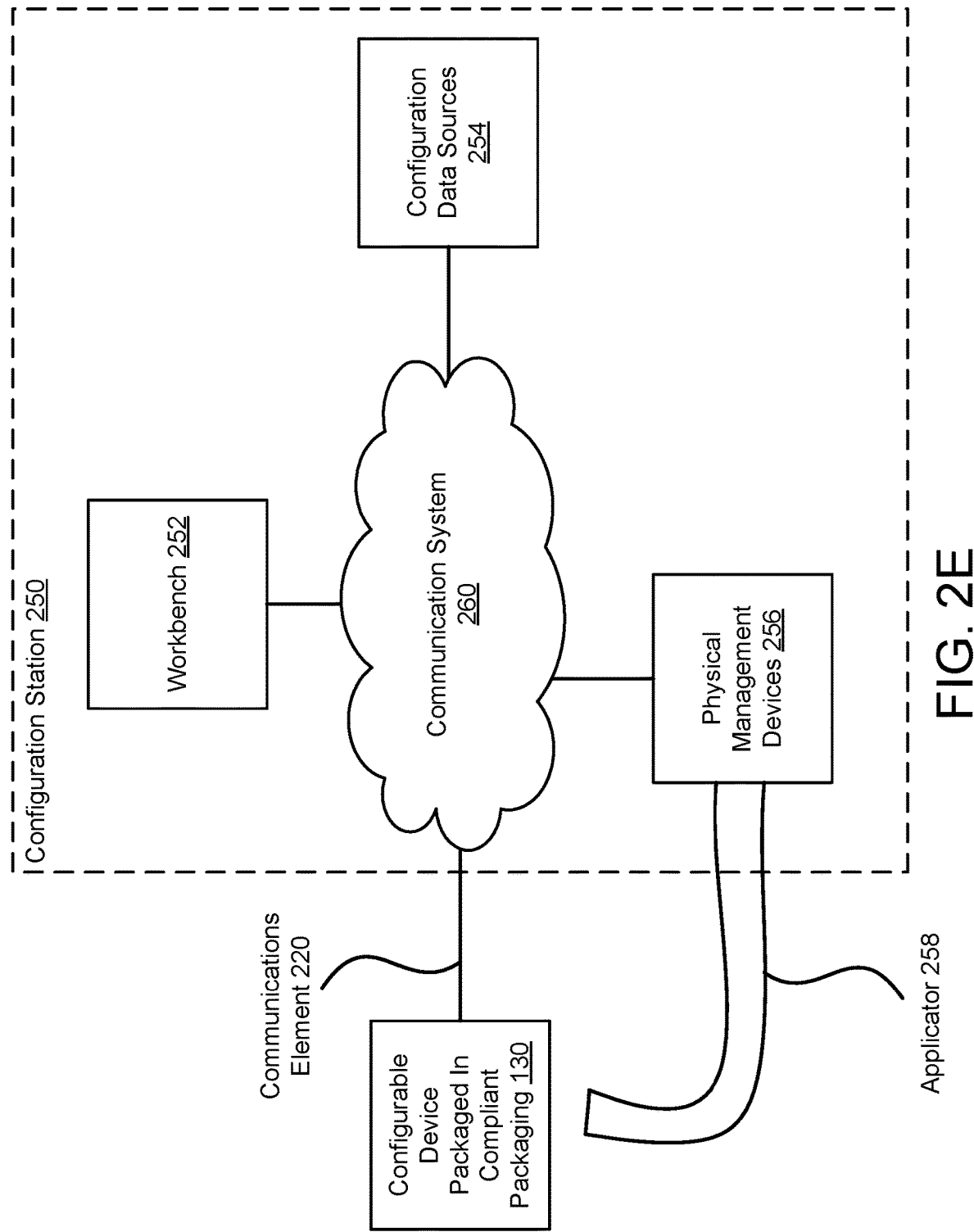
FIG. 2E shows a block diagram illustrating a configurable station in accordance with an embodiment.
Figure 3A:
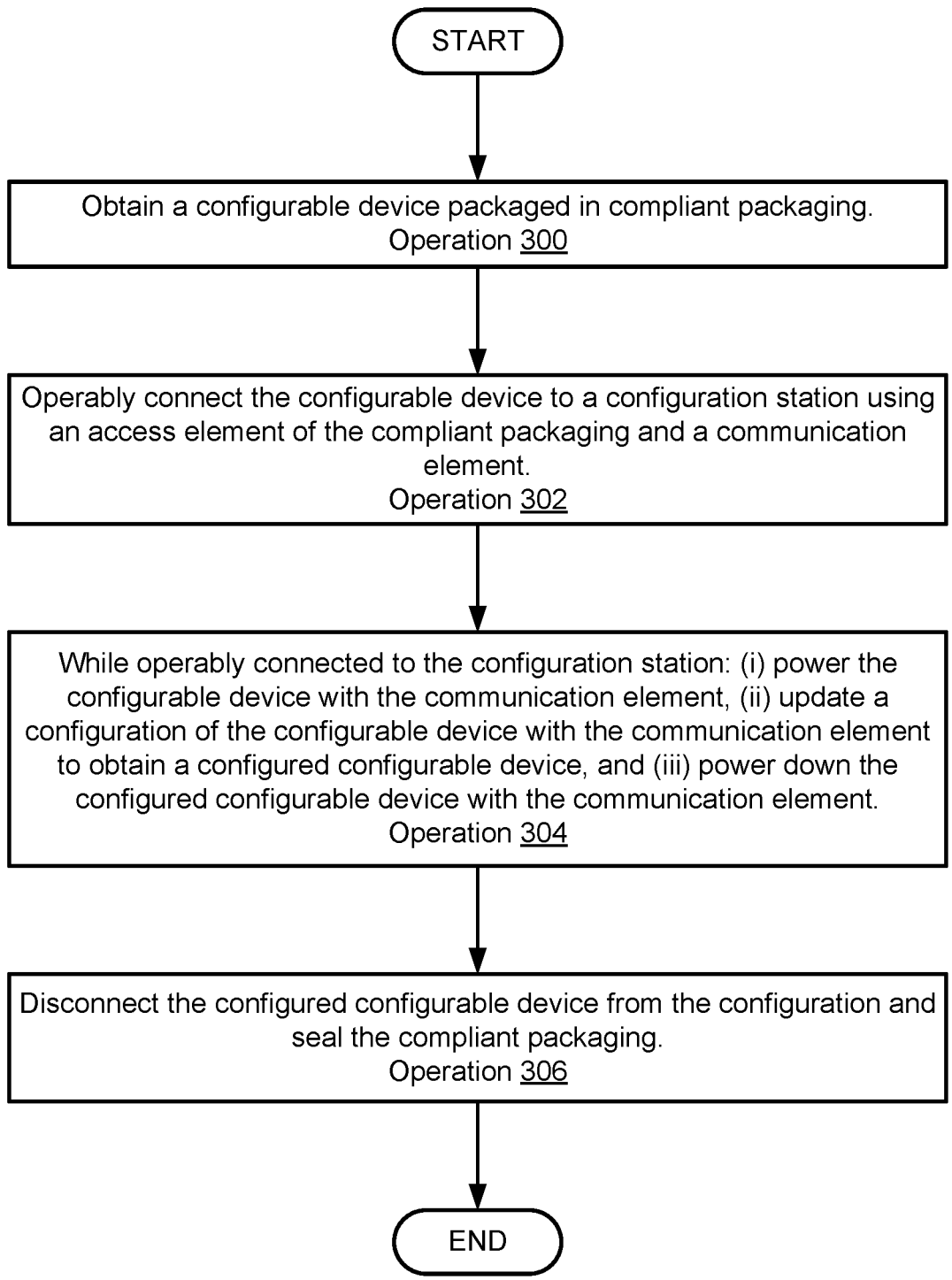
FIG. 3A shows a flow diagram illustrating a method of configuring a configurable device in accordance with an embodiment.
Figure 3B:
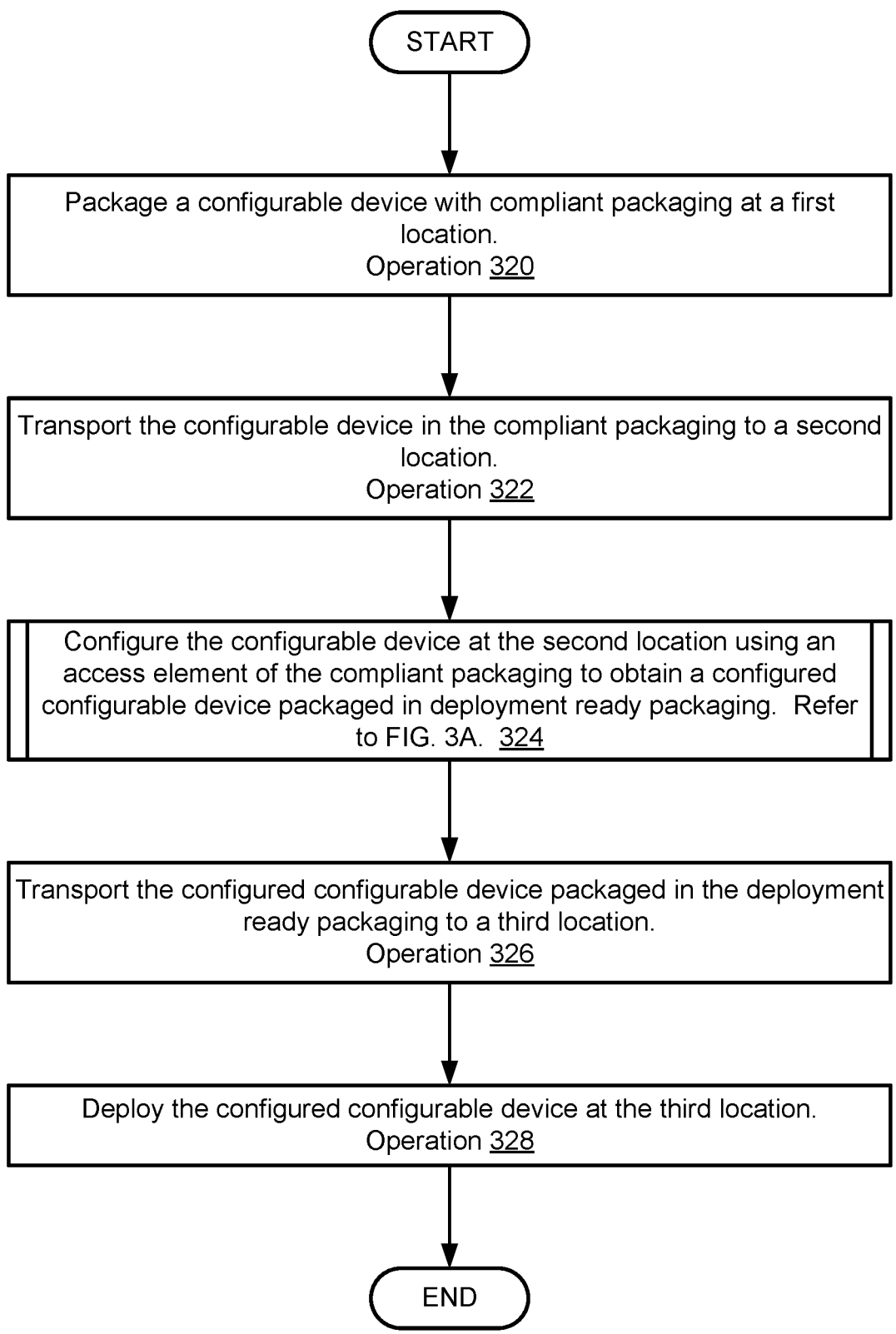
FIG. 3B shows a block diagram illustrating a method of deploying a configurable device in accordance with an embodiment.

Refer to FIGS. 2B-2E for additional details regarding components that may be located at configuration site 110, and FIGS. 3A-3B for additional details regarding configuration process 140.

Deployment site 120 may correspond to any physical location where a configurable device may be deployed. For example, deployment site 120 may be a location where a person that will use the configurable devices lives or works, where a high density computing environment (e.g., server farm) is located (e.g., where a server may be deployed), at part of an environment directly connected to the Internet or with a cloud resource such as a cloud service (e.g., a computing environment presenting itself as a single device/service implemented with multiple computing devices), or may be another type of location to which a configurable device may be deployed for use.

To manage the process of configuring and deploying configurable devices, the system of FIG. 1 may include a device deployment manager 160. Device deployment manager 160 may, for example, identify configurations for configurable devices, ensure that the configurable devices are configured accordingly, and manage deployment of the configurable devices to various locations. To do so, device deployment manager 160 may be operably connected to any number of systems at the various sites 100, 110, 120 and through which the device deployment manager 160 may provide its functionality.

For example, device deployment manager 160 may maintain various repositories (e.g., data structures such as lists, linked lists, tables, databases, etc.) of information regarding the desired configurations of configurable devices, the actual configurations of the configurable devices, the locations of the configurable devices, and/or various information regarding deployed configurable devices at various deployment sites. Device deployment manager 160 may use the aforementioned information to manage the process of configuring and deploying configurable devices.

Figure 4:
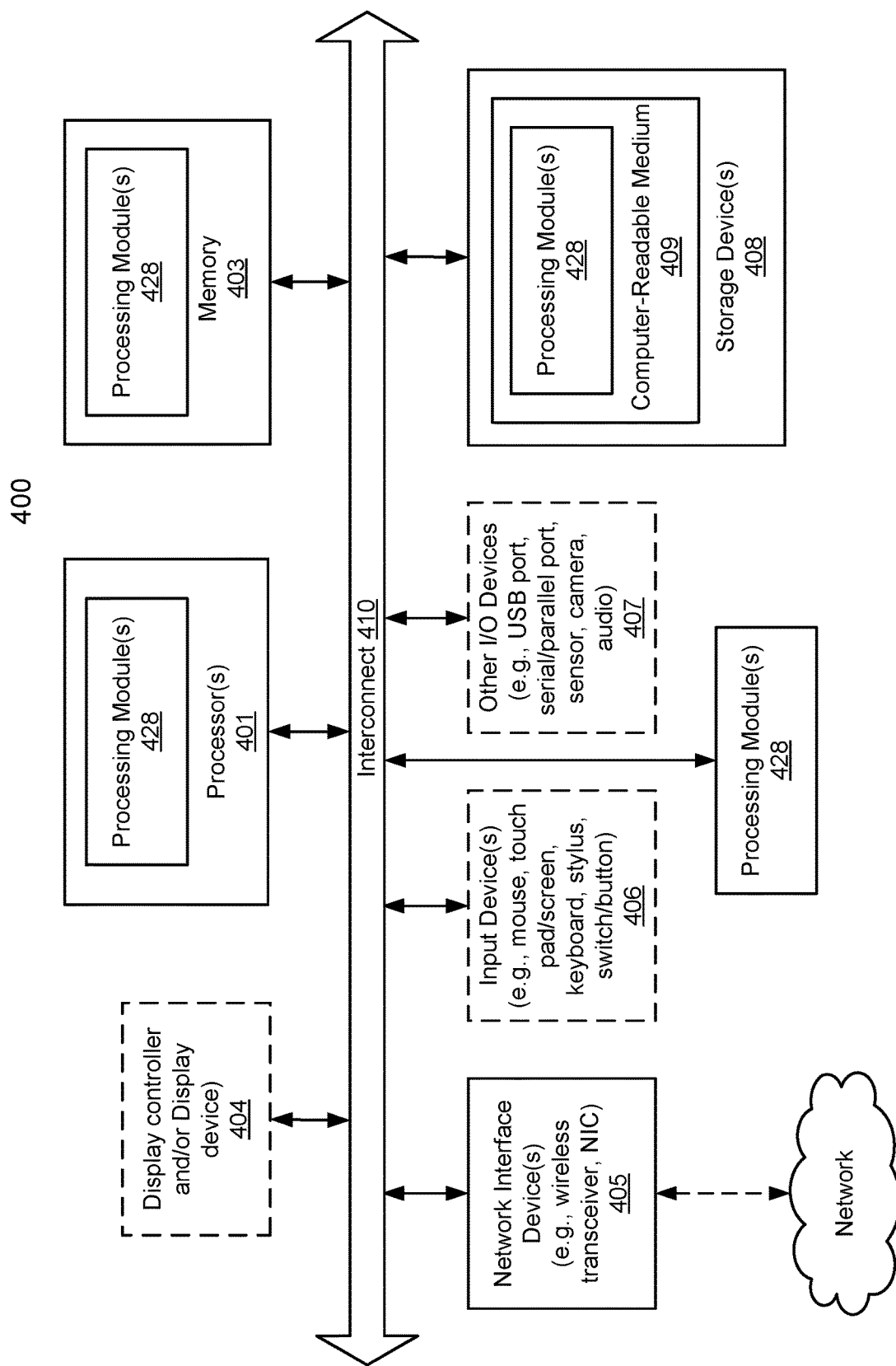
FIG. 4 shows a block diagram illustrating a data processing system in accordance with an embodiment.

In an embodiment, a configurable device and/or device deployment manager 160 is implemented with a computing device. Refer to FIG. 4 and the corresponding description below for additional details regarding computing devices.

While the system of FIG. 1 is shown with a limited number of specific component, a system in accordance with embodiments may include additional, different, and/or fewer components without departing from embodiments disclosed herein.

Turning to FIG. 2A, a diagram of a configurable device packaged in compliant packaging in accordance with an embodiment is shown. In FIG. 2A, configurable device 200 is illustrated outside of compliant packaging 210. However, in an embodiment (e.g., as shown in FIGS. 2B-2D), configurable device 200 is positioned inside of compliant packaging 210 (e.g., to obtain configurable device packaged in compliant packaging 130 as discussed with respect to FIG. 1).

Configurable device 200 may include any type of computing device such as, for example, a laptop computer, a tablet computer, a personal electronic device such as a smart phone, a desktop computer, a server, etc. Configurable device 200 may, as discussed above, be configurable to provide any number and types of functionalities based on its configuration. Configurable device 200 may generally be adapted to be configured based on information transmitted to (and/or from) configurable device from another entity. Refer to FIG. 2E for additional details regarding an entity that may provide information to configurable device 200 to configure it.

The information may include, for example, instructions to power on or off; instructions to install and/or remove certain software such as firmware, applications, operating systems, etc.; instructions to modify settings for software and/or hardware components of configurable device 200; and/or instructions to perform other types of operations that may place configurable device 200 into a desired configuration. The desired configuration may correspond to one specified by, for example, a future user, future owner, and/or future operator of configurable device 200 (and/or a combination thereof and/or other persons).

To provide for configuration, configurable device 200 may include configuration element 202. Configuration element 202 may be a physical structure through which information and/or power may be obtained by configurable device 200. Configurable device 200 may also provide information to other entities via configuration element 202.

In an embodiment, configuration element 202 includes a port, connector, or other physical structure through which an operable connection (e.g., data, power, etc.) to one or more other entities may be formed. For example, configuration element 202 may include a standards compliant connector to which a cable or other physical device for forming an operable connection may be attached. In an embodiment, configuration element 202 is adapted to receive a universal serial bus connector. The universal serial bus connector may be a type-C connector and may include appropriate hardware to allow for power delivery, data delivery/transmission, alternate mode operation, and/or other functionality.

In an embodiment, when configurable device 200 receives information (e.g., which may include instructions) and/or power via configuration element 202, configurable device 200 may automatically take action to configure itself using the information and/or power. For example, configurable device 200 may host a configuration management application (e.g., computer instructions stored in persistent storage that when executed by a processor of configurable device 200 cause configurable device 200 to perform the functionality of the application) that is automatically triggered to execute upon receiving information and/or power via configuration element 202. The configuration management application may parse the information and initiate performance of operations based on the information. In an embodiment, the information received via configuration element 202 includes (i) a power-on instructions, (ii) software component installation/removal instructions, (iii) hardware and/or software component setting update instructions, and/or (iv) power-down instructions.

In an embodiment, the hardware and/or software component settings update instructions include some settings to be implemented during configuration and other settings to be implemented after configuration. The settings to be implemented during configuration may provide for (i) thermal management by limiting power consumption (e.g., to manage heat while configurable device 200 is positioned in compliant packaging 210), (ii) security by limiting functions of configurable device 200 that may be performed, data that may be accessed/modified, etc., and/or (iii) other functions. The settings to be implemented after configuration may provide for meeting of goals associated with future operation of configurable device 200. For example, the settings may focus on performance rather than power consumption/heat generation (e.g., because configurable device 200 is less likely to be positioned in compliant packaging 210 after configuration is complete, e.g., post deployment), accessibility or access limitations depending on a future use case (e.g., such as limiting the operation of various ports/connectors of configurable device 200), and/or other functionalities. In addition to settings instructions, the instructions provided to configurable device 200 may also provide for various software applications to be hosted during configuration and/or removed prior to deployment. Like the settings instructions, the software applications may provide for different behavior of configurable device 200 during configuration such as to manage heat generation, communications, various threats (e.g., third party attackers mitigated by locking down communications, various types of operations, etc.), etc.

In an embodiment, configuration element 202 is positioned on an exterior of an enclosure of configurable device 200. The position of configuration element 202 may be complementary to access element 212 of compliant packaging 210 (e.g., when configurable device 200 is positioned in a predetermined position/orientation in compliant packaging 210. When so positioned, access element 212 may be usable to temporarily expose configuration element 202 such that a corresponding cable may be attached to configuration element 202 to allow other entities to send instructions and/or power to configurable device 200.

Compliant packaging 210 may include a physical structure in which a configurable device 200 may be housed. For example, compliant packaging 210 may include a rectangular box with an interior in which a configurable device may be positioned. Compliant packaging 210 may also include other physical structure such as, for example, blocks, packing peanuts, and/or other structures usable to maintain a position of a configurable device while inside of compliant packaging 210, direct airflow within compliant packaging 210, and/or provide other functionalities. Compliant packaging 210 may include any number of sealable flaps, opening, etc. to allow a configurable device to be positioned within it, and then these structures may be sealed to substantially surround the configurable device. For example, flaps may be moved, tabs may be closed, securing structures such as tapes may be used to fix the flaps and/or other structures in place to seal compliant packaging 210. Compliant packaging 210 may be so sealed at, for example, manufacturing site 100.

In an embodiment, compliant packaging 210 includes access element 212. Access element 212 may include a physical structure for (i) temporarily sealing compliant packaging 210 prior to configuration of a configurable device positioned in compliant packaging 210, (ii) temporarily exposing a portion (e.g., configuration element 202) of a configurable device in compliant packaging 210 to facilitate configuration, and (iii) sealing of compliant packaging 210 after a configurable device in compliant packaging 210 is configured.

In an embodiment, access element 212 is implemented with a flap that covers an opening in compliant packaging 210. The flap and opening may be positioned complementary to where configuration element 202 when configurable device 200 is positioned in compliant packaging 210 such that configuration element 202 may be exposed to an ambient environment while the flap is actuated to an open position.

Access element 212 may also include a securing element (not shown) such as a tape. The securing element may allow for the flap to seal the opening after a configurable device in compliant packaging 210 is configured.

Access element 212 may further include a security element (not shown) such as a hologram position on the tape. The hologram may provide a visual indication with respect to the flap was open after it sealed the opening. In this manner, a subsequent user (e.g., at a deployment site) of a configured configurable device may be warned regarding potential tampering with or an undesired configuration of the configurable device in compliant packaging 210.

Access element 212 may further include channels (not shown) usable to thermally manage a configurable device during configuration. For example, the channels may allow for air to flow to configurable device 200 while it is positioned in compliant packaging 210 during configuration (which may cause configurable device 200 to generate heat). Generally, configurable device 200 may include functionality to thermally manage itself while in an ambient environment and not surrounded by compliant packaging 210. The channels may be, for example, a portion of the opening or positioned with the opening such that air may be directed to the configurable device for cooling purposes.

While illustrated in FIG. 2A with a limited number of specific components, a configurable device and compliant packaging in accordance with embodiments disclosed herein may include different, additional, and/or fewer components than those illustrated and discussed herein.

Turning to FIGS. 2A-2D, diagrams illustrating configurable device 200 positioned in compliant packaging 210 at different stages of a configuration of configurable device 200 in accordance with embodiments disclosed herein are shown. In these figures, portions of these components that would otherwise be obscured from view are drawn with dashed lines. For example, the majority of configurable device 200 is illustrated with dashed lines to indicate that compliant packaging 210 may generally obscure it from view (while other portions such as configuration element 202 are illustrated with solid lines to indicate that they may be viewable in some of these figures).

Turning to FIG. 2B, when the configurable device is positioned in compliant packaging 210, access element 212 may be actuated (e.g., by application of force to cause it to rotate, translate, etc.) such that opening 214 is unsealed. Through opening 214, configuration element 202 may be exposed to an ambient environment while the other portions of the configurable device may not generally be exposed to the ambient environment.

Turning to FIG. 2C, connector 222 (attached to communications element 220) may be connected to configuration element 202 to facilitate information and power flow to the configurable device in compliant packaging 210.

Connector 222 may be implemented with a physical structure adapted to interface with configuration element 202. For example, connector 222 may be implemented with a standards compliant structure complementary to configuration element 202. In an embodiment, connector 222 is implemented with a universal serial bus type C connector.

Communication element 220 may be a physical structure adapted to transmit power and/or data. Communication element 220 may be operably connected to connector 222 thereby allowing for information and/or power to be provided to a configurable device. While not illustrated in FIG. 2C, one end of communication element 220 may be operably connected to an entity tasked with configuring a configurable device. Refer to FIG. 2E for additional details regarding entities tasked with configuring configurable devices.

In an embodiment, communication element 220 is implemented with a cable having conductors and insulation in compliance with a communication and/or power distribution scheme. The cable may be, for example, a shielded or unshielded cable. As will be discussed below, the cable may be operably connected to a configuration station used to configure the configurable device in compliant packaging 210.

Turning to FIG. 2D, after the configurable device in compliant packaging 210 is configured, access element 212 may be actuated to seal compliant packaging 210. When actuated, tape or other securing elements of access element 212 may fixedly seal compliant packaging 210 such at the configuration element, previously exposed, is no longer accessible from outside of compliant packaging 210. In this manner, the configurable device in compliant packaging 210 may be shipped to a deployment site with limited risk of third parties modifying the configuration of the configurable device. Consequently, it may be more likely that the configurable device operates in a manner desired by an end user/owner/operator.

As discussed above, prior to shipment to a deployment site, a configurable device may be configured using a configuration station. Turning to FIG. 2E, a diagram of configuration station 250 in accordance with an embodiment is shown. As seen in FIG. 2E, a configurable device packaged in compliant packaging 130 may be operably connected to configuration station 250 via communication element 220. In FIG. 2E, an access element of the compliant packaging may be in a similar position as shown and discussed with respect to FIG. 2C.

To provide for configuration of configurable devices, configuration station 250 may include workbench 252, configuration data sources 254, and physical management devices 256. Each of these components may be operably connected via communication system 260, and each component is discussed below.

Workbench 252 may provide for the management of a configuration of a configurable device. Workbench 252 may be implemented with, for example, a computing device that may invoke the functionality of the other components of configuration station 250. Workbench 252 may include a monitor and one or input devices usable to, for example, initiate configuration of a configurable device.

Configuration data sources 254 may provide for deployment of information for configuration of a configurable device. Configuration data sources 254 may be implemented with any number and types of persistent storages that store data. The persistent storage may be local and/or remote. For example, the persistent storage may be implemented with universal serial bus storage devices, network storage, online storage, cloud storage, etc.

The data may include any type and quantity of data usable to configure a configurable device. The data may include, for example, images of applications, management entities, firmware, as well as repositories of settings for various hardware/software devices. Any of the aforementioned data may be keyed, categorized, or otherwise organized such that data relevant to configuring a particular configurable device may be discriminated from other data. For example, a key may be used to identify data relevant to configuring a particular configurable device (e.g., while ignoring other data that may be relevant to configuring other configurable devices). Various portions of the configuration data sources 254 may be deployed to a configurable device via communication system 260 when so invoked by workbench 252 or another entity.

Physical management devices 256 may provide for the physical management of the configurable device packaged in compliant packaging 130. The physical management may include, for example, thermal management, security management, etc. Physical management devices 256 may include, for example, sources of air usable to thermally manage configurable devices (e.g., packaged in compliant packaging), record a scene including the configurable device during configuration, and/or perform other functions. To do so, physical management devices 256 may include applicator 258. Applicator 258 may include a hose and/or positioning device so that various physical management devices 256 may be appropriately positioned to physically manage a configurable device packaged in compliant packaging 130 during configuration.

Communication system 260 may provide for (i) communication between a configurable device and various components of configuration station 250 and (ii) distribution of power to a configurable device operably connected to communication system 260. For example, communication system 260 may be implemented with a docking station to which communications element 220 is operably connected. The docking station may be operably connected to a router, switch, or other communications management device such that the other components of configuration station 250 may communication with one another and/or with the configurable device via the docking station. The communications management device may also be operably connected to the Internet or other type of network to allow for data from various configuration data sources 254 that are remote to be used to configure the configurable device. The communications management device may be further connected to other sources of data such as universal serial bus storage, compact disk media, and/or other types of media that do not utilize network connectivity (e.g., any of these devices may be connected to the configurable device via a dock or other piece of hardware).

For example, when a configurable device is operably connected to communication system 260, power may begin to flow to it. Workbench 252 may be used to send a power-on command to the configurable device thereby causing it to become active. Workbench 252 may then cause various portions of data from configuration data sources 254 to be sent to and implemented by the configurable device. While all, or a portion, of the aforementioned process is being performed, workbench 252 may invoke the functionality of one or more physical management devices 256 to facilitate configuration of the configurable device by, for example, managing its thermal state by cooling it, managing its security by recording a scene including it, recording logs of events from the configurable device and/or other components operably connected to the configurable device, etc. After the configurable device has been configured, workbench 252 may be used to send a power-off command to the configurable deice thereby causing it to become inactive.

As discussed above, the components of FIG. 1 may perform various methods to manage configurable devices. FIGS. 3A-3B illustrate methods that may be performed by the components of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of configuring a configurable device in accordance with an embodiment is shown.

Prior to operation 300, a configurable device may be manufactured, packed in compliant packaging, and shipped to a location where a configuration station is present.

At operation 300, a configurable device packaged in compliant packaging is obtained. The configurable device packaged in compliant packaging may be obtained locally (if near a place where so packaged) or remotely via a shipping process.

At operation 302, the configurable device packaged in compliant packaging is operably connected to a configuration station using an access element of the compliant packaging and a communication element. For example, the configurable device packaged in compliant packaging may be operably connected similarly to as illustrated in FIGS. 2A-2D. To do so, the access element may be actuated to reveal an opening in the compliant packaging. A connector of the communication element may then be attached to a configuration element of the configurable device.

At operation 304, while the configuration station is operably connected to the configurable device packaged in the compliant packaging, (i) the configurable device is powered on with the communication element, (ii) a configuration of the configurable device is updated with the communication element to obtain a configured configurable device, and (iii) the configured configurable device is powered down with the communication element. To power on the configurable device, a workstation of the configuration station may send an instruction via the communication element to the configurable device that causes the configurable device to power on with power obtained via the communication element. Likewise, a power down instruction may be sent with the workbench to power off the configured configurable device. The configurable device may be configured by deploying data to it from any number of configuration data sources.

At operation 306, the configured configurable device is disconnected from the configuration station and the compliant packaging is sealed. Sealing the compliant packaging may be used to obtain deployment ready packaging.

In addition, sealing the compliant packaging may include deploying port blockers or other structures to a configuration element of the configurable device and/or one or more security elements such as holographic stickers may be deployed to the packing to reduce the likelihood of third parties from modifying the configuration of the configured device. A port blocker may be a physical device that, once deploys, prevents physical access to a port, connector, etc. The port blocker may not be removed (or may be challenging to remove) unless compliant packaging is removed from a configurable device to which a port blocker has been deployed.

The method may end following operation 306.

Turning to FIG. 3B, a flow diagram illustrating a method of deploying a configurable device in accordance with an embodiment is shown.

At operation 320, a configurable device is packaged with compliant packaging at a first location. For example, at a factory, the configurable device may be packaged with compliant packaging after being manufactured. The configurable device may not be configured at this point. The compliant package may be used as packaging for the configurable device until it is deployed.

At operation 322, the configurable device in the compliant packaging is transported to a second location. A configuration station may be located at the second location. For example, the first location may be a factory or packaging facility and the second location may be a configuration site, fulfillment site, etc. where the configurable device will be configured such that the configurable device, once deployed, with meet desired expectations.

At operation 324, the configurable device in the compliant packaging is configured at the second location using an access element of the compliant packaging to obtain a configured configurable device packaged in deployment ready packaging. The aforementioned process may be performed via the method illustrated in FIG. 3A.

The deployment ready packaging may include one or more security features usable to ascertain whether it is likely that the configured configurable device may have been tampered with post configuration. The deployment ready packaging may be formed by, for example, using the access element and/or other structures to seal the compliant packaging. Thus, the configured configurable device may be packaged with the deployment ready packaging without removing the compliant packaging.

At operation 326, the configured configurable packaged in the deployment ready packaging is transported to a third location. The third location may be a deployment site where the configured configurable device will be deployed.

At operation 328, the configured configurable device is deployed to the third location. The configured configurable device may be deployed by, for example, removing the deployment ready packaging and/or using the deployment ready packaging to ascertain whether the configured configurable device should be suspected of being tampered with post configuration.

If the configured configurable device is suspected of being tampered with, one or more remedial actions may be performed include, for example, returning the configured configurable device for re-configuration, activing a piece of validation software hosted by the configured configurable device, notifying a manufacturer of the configured configurable device, etc. In some cases, a remote validation by a manufacturer of the configured configurable device may be performed. The software based or remote validation may include, for example, using signatures of entities (e.g., applications, BIOS, etc.) hosted by the configured configurable device to ascertain whether any of the entities have been tampered with or otherwise are inconsistent with a desired configuration of the configurable device.

As part of the deployment, the configurable device may notify a device deployment manager 160 indicating (i) whether deployment is successful and (ii) when successful, information about how the configured configurable device is deployed such that device deployment manager 160 may appropriately report the deployment status of the configured configurable device.

The method may end following operation 328.

Any of the components illustrated in FIGS. 1-3B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS/iOS from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a configurable device, the method comprising:
   obtaining the configurable device packaged in compliant packaging, the configurable device being configured to provide computer implemented services to other entities;
   operably connecting the configurable device packaged in the compliant packaging to a configuration station using an access element of the compliant packaging and a communication element;
   while the configuration station is operably connected to the configurable device and with the configuration station:
      changing a power state of the configurable device from unpowered to powered, wherein changing the power state of the configurable device to powered comprises powering on a processor of the configurable device while the configurable device is packaged in the compliant packaging,
      while in the powered state, configuring the configurable device with the communication element to obtain a configured configurable device that is configured to provide updated computer implemented services, and the processor being configured to provide, at least in part, the updated computer implemented services provided by the configured configurable device, and
      changing a power state of the configured configurable device from powered to unpowered;
   disconnecting the configured configurable device from the configuration station; and
   sealing the compliant packaging using a securing element attached to the access element to obtain a configured configurable device packaged in deployment ready packaging, wherein the securing element is distinct from the access element.

2. The method of claim 1, wherein operably connecting the configurable device packaged in the compliant packaging to the configuration station comprises:
   actuating the access element to unseal the compliant packaging;
   inserting the communication element into the unsealed compliant packaging;
   physically connecting a connector of the communication element to a corresponding connector of the configurable device; and
   directing an air to flow from an ambient environment and into channels of the access element to flow air to the configurable device.

3. The method of claim 2, wherein actuating the access element to unseal the compliant packaging creates a sealable opening on an exterior of the compliant packaging through which the connector of the communication element is inserted, and sealing the compliant packaging comprises sealing the sealable opening.

4. The method of claim 3, wherein configuring the configurable device comprises installing an operating system, and the processor is a main processing unit for the configurable device that executes, at least in part, instructions for operation of the operating system.

5. The method of claim 4, wherein changing a power state of the configurable device from unpowered to powered further comprises:
   sending, using the communication element of the configuration station, power to the configurable device to power on at least the processor of the configurable device using the configuration station while the configurable device is packaged in the compliant packaging.

6. The method of claim 1, wherein configuring the configurable device with the communication element further comprises:
   receiving, by the processor and via the communication element, configuration instructions for updating a configuration of the configurable device; and
   executing, by the processor, the configuration instructions to install the configuration instructions using the processor such that an update of the configurable device to obtain the configured configurable device is completed while the configurable device is still packaged in the complaint package.

7. The method of claim 1, wherein changing a power state of the configured configurable device from powered to unpowered comprises:
   terminating, with the configuration station, delivery of power to the configured configurable device via the communication element.

8. The method of claim 1, further comprising:
   packaging the configurable device in the compliant packaging at a first location; and transporting the configurable device packaged in the compliant packaging to a second location where the configuration station is positioned.

9. The method of claim 8, further comprising:
transporting the configured configurable device packaged in the deployment ready packaging from the second location to a third location; and
deploying the configured configurable device by, at least in part, discarding the deployment ready packaging.

10. The method of claim 1, further comprising:
while the power state of the configured device is powered:
injecting a fluid flow through the compliant packaging to manage a thermal state of the configurable device.

11. The method of claim 1, further comprising:
after the power state of the configured device is changed to unpowered and prior to sealing the compliant packaging:
positioning a connector blocker with the configured configurable device to prevent formation of operable connections to the configured configurable device until the deployment ready packaging is removed, wherein the connector blocker is different from the access element.

12. The method of claim 1, wherein the securing element comprises a security sticker that is placed across the access element on an exterior of the compliant packaging, wherein the security sticker comprises a hologram position.

13. The method of claim 1, wherein the configurable device is not removed from the compliant packaging until the configured configurable device is deployed.

14. The method of claim 1, wherein the communication element comprises a single cable through which power and data are transmitted to the configurable device while the configurable device is operably connected to the configuration station.

15. The method of claim 1, wherein configuring the configurable device comprises:
setting an operation of the configurable device to prioritize thermal management while the configurable device is being configured within the compliant packaging and until the power state of the configured configurable device is changed to unpowered; and
after the configuring of the configurable device is completed within the compliant packaging and before the power state of the configured configurable device is changed to the unpowered state, changing the operation of the configurable device from prioritizing the thermal management to prioritizing performance.

16. A packaged device, comprising:
a configurable device comprising:
a computing device configured to:
provide computer implemented services to other entities prior to being configured using, at least in part, a processor of the configurable device, and
provide updated computer implemented services after the computing device is configured using, at least in part, the processor of the configurable device; and
a connector adapted to operably connect the computing device to a configuration system while the computing device is in compliant packaging to facilitate:
powering on of a processor of the computing device, and
configuration of the computing device at least in part using the processor, wherein the processor is configured to provide, at least in part, the updated computer implemented services after the computing device is configured and the computer implemented services prior to the computing device being configured;
the compliant packaging comprising:
an enclosure positioned around the configurable device; and
an access element positioned to facilitate operable connection of the connector to a configuration station positioned outside of the compliant packaging and to receive a flow of air from the configuration station; and
a securing element attached to the access element,
wherein the securing element is distinct from the access element, and
wherein the access element is adapted to transition between a first position and a second position, while in the first position the access element seals the configurable device from an ambient environment using the securing element, while in the second position the access element opens a portion of the configurable device corresponding to the connector to the ambient environment.

17. The packaged device of claim 16, wherein
the securing element comprises a security element and is attached across the access element, and wherein the security element comprises a security sticker that comprises a hologram position that is adapted to indicate whether physical access to the configurable device has been made after the compliant packaging has been sealed.

18. The packaged device of claim 16, further comprising:
a connector blocker adapted to block physical access to the connector after the connector blocker is positioned with the connector, wherein the connector blocker is different from the access element.

19. A system, comprising:
a computing device; and
a configuration station adapted to:
operably connect a configurable device packaged in compliant packaging to the computing device using an access element of the compliant packaging and a single electronics cable by inserting a portion of the single electronics cable through an exterior of the compliant packaging;
while the computing device is operably connected to the configurable device and with the computing device:
change a power state of the configurable device from unpowered to powered, wherein changing the power state of the configurable device to powered comprises powering on a processor of the configurable device while the configurable device is packaged in the compliant packaging,
while in the powered state:
configure the configurable device with the communication element to obtain a configured configurable device that is configured to provide updated computer implemented services, and the processor being configured to provide, at least in part, the updated computer implemented services provided by the configured configurable device, and
direct an air to flow from an ambient environment and into channels of the access element to thermally manage the configurable device, and
change a power state of the configured configurable device from powered to unpowered; and disconnect the configured configurable device from the configuration station, wherein the compliant packaging is sealed using a securing element attached to the access element to obtain a configured configurable device packaged in deployment ready packaging, and wherein the securing element is distinct from the access element.

20. The system of claim 19, further comprising:

a physical management device adapted to manage a thermal state of the configurable device while the configurable device is in the powered state.

* * * * *